United States Patent [19]
Bender, Jr. et al.

[11] 3,858,604
[45] Jan. 7, 1975

[54] AUTOMATIC IN-LINE VALVE HAVING MULTIPLE CONICAL VALVE SECTIONS

[76] Inventors: John H. Bender, Jr., 2363 B-48th St.; Dorval D. Jeffries, 2059 E-41st St., both of Los Alamos, N. Mex. 87544; Ethen L. Ekberg, Rt. No. 1, Espanola, N. Mex. 87105; Leo A. Waldschmidt, 3229 A-Walnut St., Los Alamos, N. Mex. 87544

[22] Filed: Oct. 25, 1973

[21] Appl. No.: 409,608

[52] U.S. Cl. ............... 137/488, 137/512, 137/513.3, 137/525.1, 137/613, 137/614.11
[51] Int. Cl. ............................................ F16k 17/02
[58] Field of Search ............ 137/614.11, 614.2, 512, 137/513.3, 613, 486, 488, 505.12; 251/212

[56] References Cited
UNITED STATES PATENTS

| | | | |
|---|---|---|---|
| 586,618 | 7/1897 | Noll | 137/512 X |
| 1,926,565 | 9/1933 | Taisey | 137/512 |
| 2,508,615 | 5/1950 | Lukes | 137/512 X |
| 2,956,582 | 10/1960 | Pranter | 251/212 X |
| 3,445,863 | 5/1969 | Wada | 137/512 X |
| 3,565,106 | 2/1971 | Bairibach | 137/513.3 |
| 3,572,375 | 3/1971 | Rosenberg | 137/512 |

*Primary Examiner*—Charles J. Myhre
*Assistant Examiner*—Ira S. Lazarus
*Attorney, Agent, or Firm*—Paul D. Gaetjens

[57] ABSTRACT

An in-line valve is composed of a plurality of cone shaped sections, each of said sections having a number of segments, said segments having relief openings or orifices except in the final section, said segments being mounted within the oversized housing which connects to the conduit means, said segments being pivotably connected to said housing by a hinge and rib means so as to deploy the segments automatically to form the cone shaped valving section.

4 Claims, 6 Drawing Figures

PATENTED JAN 7 1975 3,858,604

AUTOMATIC IN-LINE VALVE HAVING MULTIPLE CONICAL VALVE SECTIONS

BACKGROUND OF THE INVENTION

1. Field of the Invention

This invention is an improvement in a conical type valve in that there are at least two valve sections, the first of which must have pressure relief orifices. In particular the valve of this invention has advantages over those of the prior art in that it is simple in construction, can be designed to fit any diameter conduit, can operate at any temperature or pressure and be used with any type of material that flows. The valve of this invention has particular utility as a reverse flow shut-off valve, as a surge-check valve, as a pressure sensitive valve, and as a flow control valve.

2. Prior Art

Applicants are aware that a conical shaped valve is old in the prior art (see W. W. Jones, U.S. Pat. No. 2,094,707). The Jones Patent shows a conical shaped valve having a plurality of triangular hinged segments using a cable means to deploy these hinged segments and having a housing constructed to contain recesses in the inner wall provided with means for connecting housing to the pipe or casing.

Applicants are also aware of P. J. Burchett, U.S. Pat. No. 2,406,662 which discloses a check valve having two clappers or hinged segments held together by an encircling resilient member such as a rubber O-ring. The valve housing in this patent is the same size as the pipe line diameter, thus there is a slight obstruction in the line using this particular valve.

Pranter, U.S. Pat. No. 2,956,582 is a somewhat different version of the same type of valve as shown in Burchett above described. In particular, the Pranter valve has two separate hinged sections which are clam shaped and has a seal member such as an O-ring. This valve has to be mechanically opened when in the closed position.

SUMMARY OF THE INVENTION

A simple, efficient, reliable valve containing multiple in-line cone sections which in turn are composed of a plurality of triangular shaped segments, said segments having relief openings or orifices which allow some flow through the section while in the closed position. Said orifices decline in both size and number in each succeeding section so that in the last section there are no orifices, thus forming a complete closure of the conduit. The valve sections may be constructed of any material which is compatible with the material that passes through the conduit. The size of the valve is designed to fit any diameter conduit. Each section contains a plurality of triangular shaped segments which form a conical shaped section. On the exterior edge of each segment is mounted a sail-type vane which is in a near perpendicular direction to the conical section. These sail-type vanes assist in closing the triangular shaped segments. It is essential that the first conical shaped section in the valve have orifices or pressure relief openings so as to prevent damage or loss of valving action. By design, the number and size of orifices will reduce the pressure which each succeeding section will face. After the flow pressure is reduced by at least one section having these orifices, the reduced flow will encounter a final conical section which will have no orifices and thus will effect the complete closure of the pipe or conduit. The segments of each section are mounted on a machined rib base and have a hinge an pivot connection which prevents leakage, said connection and rib being recessed so as to allow no impediment of flow when the said segment is in the open position.

In this invention applicants have defined the following terms:
Valve refers to the entire system while
sections are defined as the individual
valving members. The segments are triangular
shaped plates that make up each
section.

DESCRIPTION OF THE PREFERRED EMBODIMENTS

Figure 1:
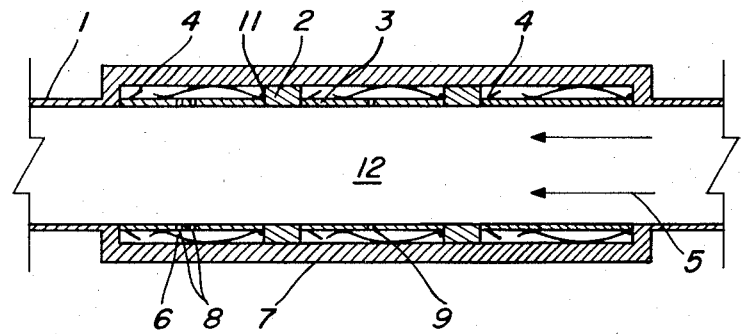
FIG. 1 is a side view shown in partial cross section of a reverse flow shut-off safety valve in the open position.
Figure 2:
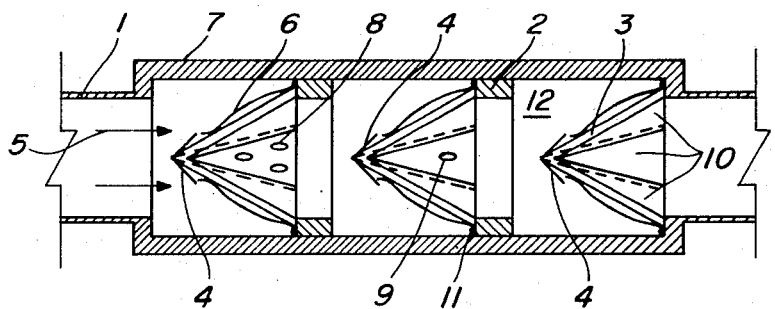
FIG. 2 is the valve of FIG. 1 in the closed position with a reversal of flow direction.
Figure 3:
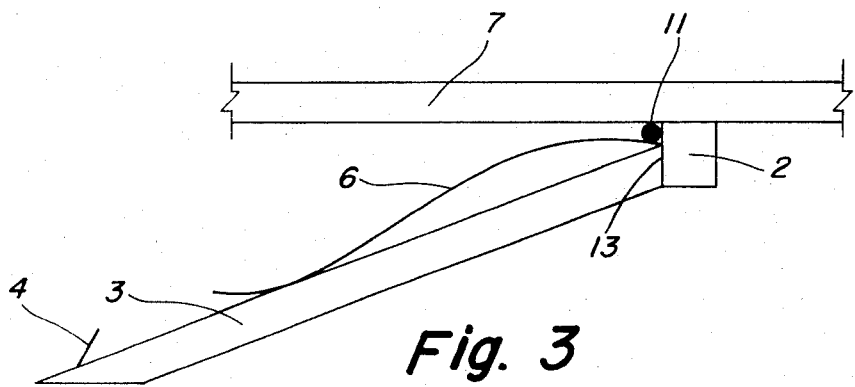
FIG. 3 is an enlarged side view of the segment and its hinge type connection as used in FIGS. 1 and 2.

Referring now to the drawings wherein like reference numbers designate like or corresponding parts throughout the views, there is shown in FIG. 1 a normal conduit or line 1. The valve housing 7 is oversized and has a rib base 2 on which is mounted a pivot 11 and to which the triangular shaped segments 3 are attached, said segments having a near perpendicular sail-type vane 4 attached to the exterior edge of each of the segments 3. The segments 3 have orifices 8 and 9 in the first and second sections of the valve 12. A spring means 6 provides tension on the segment 3 so as to automatically deploy the segment when flow pressure as indicated by arrow 5 reverses. In FIG. 2 the segments have formed a conical shaped section 10 in the closed mode, that is, when the particular valve is used as a reverse flow shut-off (safety) valve. Normal flow 5 is from base to apex, however, as shown in FIG. 2 the flow in a reverse direction 5 closes the valve 12. Thus, in the configuration shown in FIGS. 1 and 2 if there is a reversal of flow the sections will automatically close and the sail-type vanes 4 will aid in this closing since the flow will strike this vane when the segments are partially deployed. The relief orifices 8 and 9 prevent damage or loss of the valving member due to extreme pressures. Attainment of normal flow direction will automatically open each of the sections since the spring 6 will allow the valve 12 to be opened when full normal line pressure and normal flow direction are attained. FIG. 3 shows in greater detail the tension spring 6, the perpendicular sail-type vane 4, the valve housing 7 having a recessed cavity to contain the triangular shaped segment 3 which is attached to said housing by means of hinge connection 13, rib base 2 and pivot 11.

SECOND EMBODIMENT OF THE INVENTION

Figure 4:
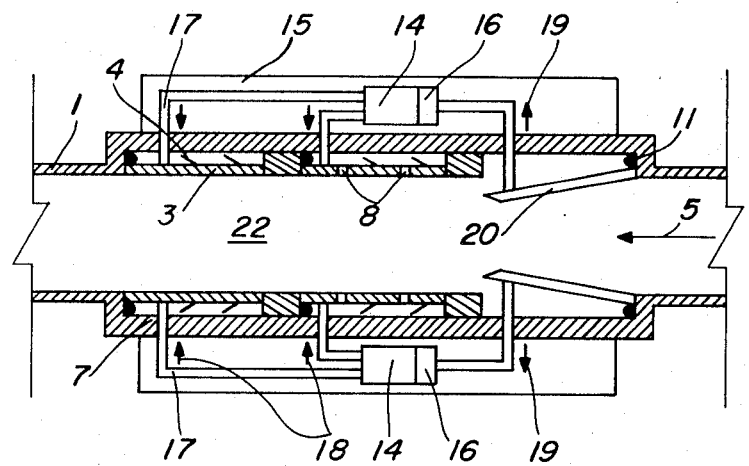
Figure 5:
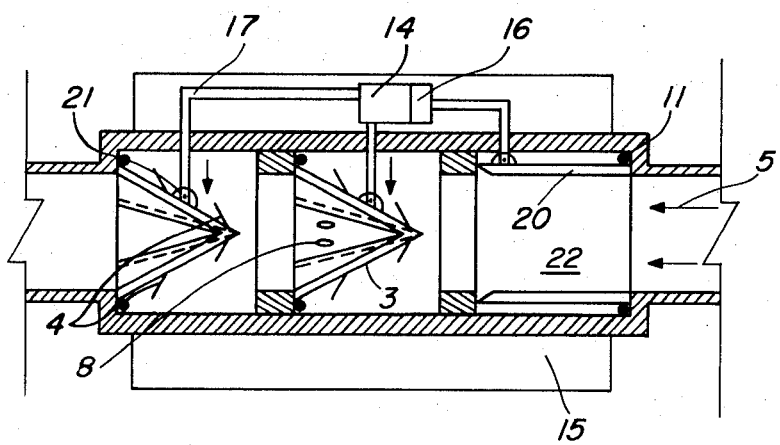
FIG. 5 is the valve of FIG. 4 when overpressure causes the sections to close.
Figure 6:
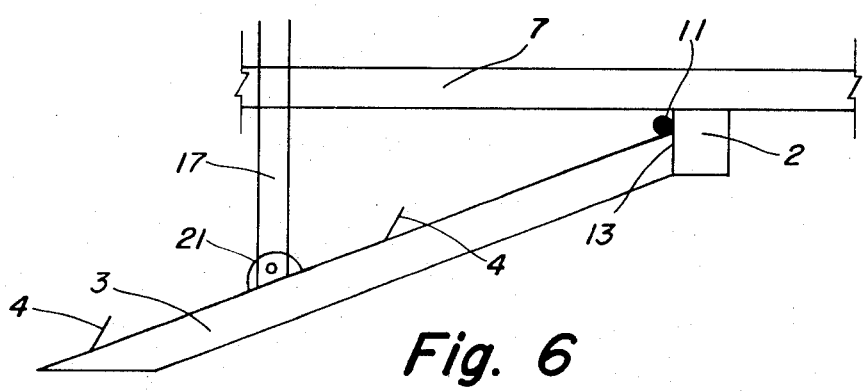
FIG. 6 is an enlarged side view of the segment rib base, vane, and mechanical means to operate the segment as used in FIGS. 4 and 5.

FIGS. 4, 5, and 6 show a second embodiment of the valve 22 of this invention being used as a surge-check valve. In particular, FIG. 4 shows the segments 20 which may be operated hydraulically, electrically, mechanically, or a combination of these means to force the triangular shaped segments 3 to either an open or closed position. FIG. 4 shows schematicaly a hydraulic system 14 with piston 16 and associated multiplier system 17. An oversurge in pressure causes segments 20 to open full and actuate the hydraulic system 14 thereby closing the segments 3 in the valve sections. The segments are mounted in the same manner as described above and have pressure relief orifices 8 which allow a pressure drop through the cone shaped section without damaging the valve. The last cone section in the series has no orifices 8 and effects a complete closure of the pipe or line 1. Flow is indicated by directional arrow 5. The force caused by overpressure is transmitted in the direction indicated by arrows 17, 18, and 19. FIG. 5 shows the cone shaped sections deployed in the closed position and further shows the arm and pivot 21 which has caused segments 3 to form a complete inline series of conical sections which are aided by near perpendicular sail-type vanes 4. FIG. 6 is an enlarged view of a segment 3, pivot point 11, base rib attachment 2 with hinge connection 13 with machined surface.

When in use as a surge-check valve as shown in FIGS. 4 through 6 normal flow rates through valve section 20 are permitted the valve and the secondary sections of the valve 22 are in the open position. A surge in line pressure will force the first valve section 20 completely open. Force equalizers or multiplier means denoted schematically as call outs 14, 16, 17, and 21 will close the secondary sections. The first of the secondary sections of the valve has a discreet number of pressure relief openings or orifices 8 so as to permit a necessary pressure drop, thus preventing damage of the valve. A. A list of possible construction materials for any part of the valve are:

| 1. | Plastic materials | 5. | Nickel alloys |
| 2. | Aluminum and magnesium alloys | 6. | High-temperature alloys |
| 3. | Copper, bronze, iron and their alloys | 7. | Cermets |
| | | 8. | Ceramics |
| 4. | Steel, all alloys | 9. | Fibre reinforced cermets, ceramics and metals |
| | | 10. | Glass |

VALVE OPERATION AND PARAMETERS

A. When in use as a reverse flow shut-off (safety) valve as shown in FIGS. 1 and 2, normal flow is from base to apex of the opened cone with no impediment to flow or passage of extraneous materials, (i.e., line scrubbers); however, if for any reason a reversal of flow occurs the valve will close automatically by the flow force against the perpendicular sail-type vanes on the conical triangular shaped segments of each valve section and/or with mechanical, pneumatic, hyraulic, or electrical tension balancers to add extra closing force. When used in series the relief openings in all but one of the cone shaped sections prevents damage or loss of the valving action due to extreme pressures or flow rates. Attainment of normal flow direction automatically opens the valve and if tension balancers are used full normal line pressure will open the valve.

When in use as a surge-check valve as shown in FIGS. 4 and 5 normal flow rates through valve section (20) (base to apex) is permitted. A surge in line pressure will force valve section 20 completely open, force equalizers or multipliers (mechanical, pneumatic, hydraulic or electrical) will close cone shaped sections 3. A series of valve sections with decreasing relief openings are required.

B. Relation of pressure versus number of valves in series
  1. Up to 500 psi = 3 valves in series
  2. Over 500 psi = 4 or more valves in series C. Example of valve series and orifices for a 6 inch line (I.D.), 500 psi using a cone base of 6 inch diameter 10 inch height and 12 triangular shaped segments for each valve section;

Total area of cone surface = 97.07544 square inches
  1. Valve orifice area of 1st in series = 48.5 square inches
  2. Valve orifice area of 2nd in series = 24.25 square inches
  3. Valve orifice area of 3rd in series = 0 square inches Orifice shape = "tear" or triangular with small end towards apex of cone segment.

Size and Spacing of orifices;
Size of orifice = number of orifices × number of segments divided by the square inches required as openings. Size of a 3 section valve:

First cone shaped Section C-1. = 48.5 square inches, size of each orifice (24) is determined by its position in the segment - smaller towards apex, larger towards base (graduated) so as not to destroy physical strength of each segment (Ideal size of each orifice would be 2.02 square inches)

Second cone shaped section, C-2. = 24.25 square inches, size of each orifice (12) as in C-1 (Ideal size would be 2.02+ square inches)

Third cone shaped section, C-3 = None
Spacing:
  Valve Cone Section - C1-, 6 inches and 8 inches from apex
  Valve Cone Section - C2-, 7 inches from apex D. Example of a valve having 4 sections, orifices for a 6 inch line over 500 psi using a 6 inch diameter cone base, 10 inch high, 12 segments.
  0. Total area of cone surface = 97.07544 square inches
  1. Orifice area of 1st valve section = 48.5 square inches
  2. Orifice area of 2nd valve section = 24.25 square inches
  3. Orifice area of 3rd valve section = 12 square inches
  4. Orifice area of 4th valve section = none Spacing, Size: D1, 48.5 square inches, 36 orifices, graduated in size (approximately 1.3+ square inches)
D2, 24.25 square inches, 24 orifices, graduated in size (approximately 1.00 + square inches)
D3, 12 square inches, 12 orifices, graduated in size (approximately 1.0 square inches)
D4, None

OTHER EMBODIMENTS

When used as a pressure sensitive valve (not shown) normal flow is apex to base of the opened cone. Tension on the cone sections is equal to normal line pressure and if line pressure drops the valve will close. A return to normal line pressure will reopen the valve when tension is removed or reverse flow is allowed through the valve by means of a loop to open the valve. Also, when used as a flow control valve (not shown) one or more valves with varying size, shape and/or number of relief orifices can be brought into the flow (apex to base) to control the flow rate, the actuator foropening andclosing the valve may be mechanical, pneumatic, hydraulic or electrical.

The novel features of this invention reside in the following features:
a. automatic functioning of the valve sections in both opening and closing;
b. multiple in-line valve structure;
c. orifices in each of the valve sections except the final section, and said orifices being designed to gradually reduce flow pressure within the valve;
d. vanes attached to the exposed edge of the valve section segments so as to aid in the functioning of the valve; and
e. the wide range of utility for such valve.

It is to be understood that while we have illustrated and described certain forms of our invention, it is not to be limited to the specific forms or arrangements of parts herein described and shown except insofar as such limitations are included in the claims.

What is claimed is:
1. An automatic in-line valve for any tubular conduit comprising; a housing multiple conical valve sections in series with each other and contained within said housing, the first of said sections composed of:
a. a plurality of triangular-shaped segments being mounted within said housing and connected pivotably thereto;
b. said segments each having a sail-type vane attached to the exterior edge;
c. said segments having a plurality of orifices;
d. said orifices declining in both size and number in each of the succeeding valve sections; a second single conical valve section composed of:
a. a plurality of triangular-shaped segments being mounted within said housing and connected pivotably thereto;
b. said segments each having a sail-type vane attached to the exterior edge; and
c. being situate last in the series of the said first sections;
and means contained within the said housing and connected to the individual segments to automatically open and close said segments of the first and second sections.

2. The valve of claim 1 wherein there are at least three conical shaped sections which are in line and in series with each other.

3. The valve of claim 1 wherein the first conical sections in the series have orifices that are tear shaped with the small end of the orifice positioned towards the apex of the segment.

4. The valve of claim 1 wherein the sail-type vane is attached in a near-perpendicular position to the exterior edge of the said segment.

* * * * *